L. SCHÖN.
ARRANGEMENT FOR AUTOMATICALLY REGULATING THE VOLTAGE OF DYNAMOS.
APPLICATION FILED DEC. 23, 1913. RENEWED FEB. 27, 1920.

1,352,839.

Patented Sept. 14, 1920.

Constant Excitation

Witnesses
J. W. Wynkoop,
A. Behrens

Inventor
Ludwig Schön,
By Knight & Bros
Attorney

UNITED STATES PATENT OFFICE.

LUDWIG SCHÖN, OF ESSEN-ON-THE-RUHR, GERMANY, ASSIGNOR TO FRIED KRUPP AKTIENGESELLSCHAFT, OF ESSEN-ON-THE-RUHR, GERMANY.

ARRANGEMENT FOR AUTOMATICALLY REGULATING THE VOLTAGE OF DYNAMOS.

1,352,839.    Specification of Letters Patent.    Patented Sept. 14, 1920.

Application filed December 23, 1913, Serial No. 808,470. Renewed February 27, 1920. Serial No. 361,719.

*To all whom it may concern:*

Be it known that I, Dr. LUDWIG SCHÖN, residing at Essen-on-the-Ruhr, Germany, a subject of the Emperor of Germany, have invented a certain new and useful Improvement in Arrangements for Automatically Regulating the Voltage of Dynamos, of which the following is a specification.

The present invention relates to arrangements for automatically regulating the voltage of dynamos by means of an auxiliary voltage source connected in opposition to the dynamo through an exciting winding.

The object of the present invention is to provide an arrangement of this kind which allows a quickly operating regulation and a most accurate maintenance of the normal voltage, even when voltage sources for providing the auxiliary voltages, such as accumulator batteries or the like, which automatically deliver a constant voltage, cannot be procured, as for instance is the case on board ship.

Figure 1:
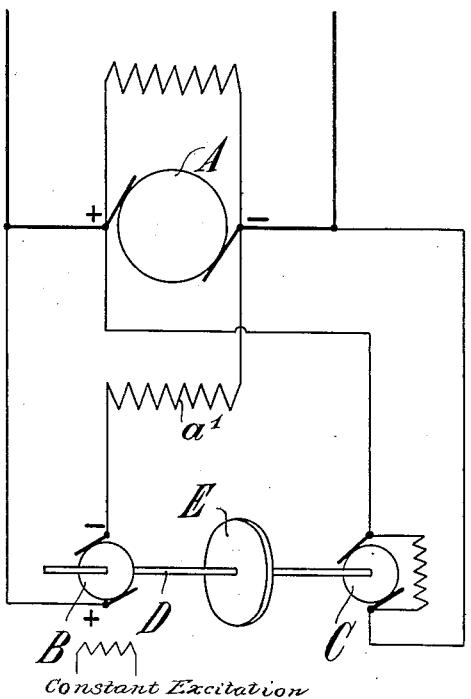
Figure 3:
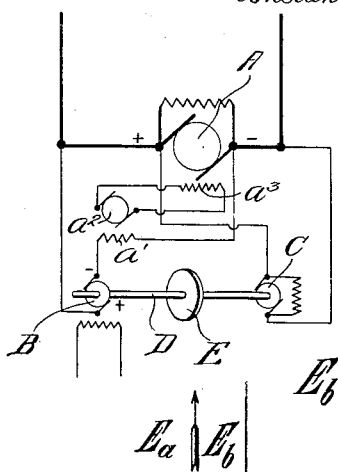
Figure 2:
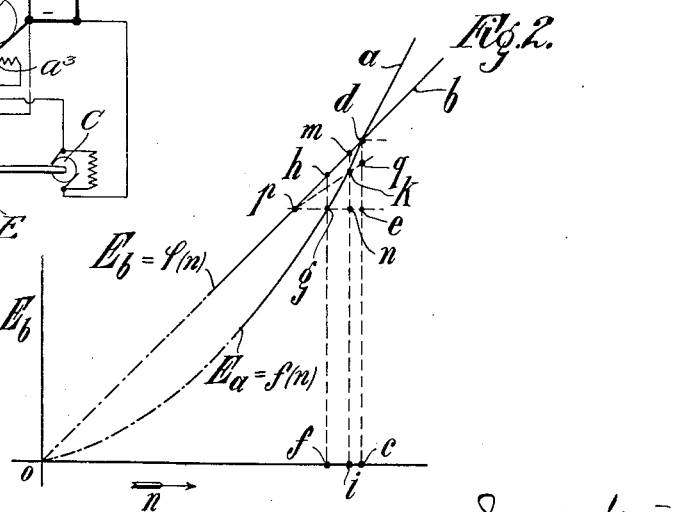

In the accompanying drawing is illustrated one embodiment of this invention, and Figure 1 shows a diagrammatic representation of the arrangement;

Fig. 2 a diagram representing the manner of operation, and Fig. 3 a diagrammatic view of an auxiliary exciting winding.

A denotes the armature of a dynamo represented as shunt generator, and $a^1$ an auxiliary exciting winding which may be arranged either on the magnet stand of the generator itself or on a separate exciting machine as in Fig. 3. In order to simplify the drawing it has been supposed that the winding $a^1$ is situated on the field-frame of the generator itself. The winding $a^1$ is fed by a small constantly excited auxiliary generator B (for example through permanent magnets), which auxiliary generator is connected, through the exciting winding $a^1$, in opposition to the armature of the generator A. The winding $a^1$ is wound in such a manner, that the current, flowing in the exciting circuit B A $a^1$ from the positive terminal of the auxiliary generator B toward the positive terminal of the main generator A, causes a strengthening of the field of the main generator. For driving the auxiliary generator B, a shunt motor C is provided which is connected with the terminals of the main generator A. The common shaft D of the motor C and the auxiliary generator B carries a fly wheel E. The relations have been so selected that the auxiliary generator B delivers voltage which is equal to the normal voltage of the main generator A, with the number of revolutions which the motor C makes during normal voltage of the machine.

The described connection operates in the following manner:

As long as the terminal voltage $E_a$ of the main generator A has its normal value and the terminal voltage $E_b$ of the auxiliary generator B in consequence has the same value, the winding $a^1$ has no current on account of the generators B and A being connected in opposition to each other. As soon, however, as the least difference appears between the voltages $E_a$ and $E_b$, an equalizing current will flow through the winding $a^1$, which current runs in the direction of removing the difference between the voltage $E_a$ and $E_b$. Should, for instance, the voltage $E_a$ decrease, in consequence of a sudden increase in load, then the voltage $E_b$ will at first retain its normal value as the number of revolutions of the auxiliary generator B, remains at first practically unchanged in consequence of the action of the fly wheel E. A compensating current will then appear in the exciting circuit B A $a^1$, which current flows through the exciting winding $a^1$ in such a direction that it causes a rising of the field strength and consequently also of the voltage of the generator A. Directly after the appearance of the disturbance, which causes diminution of voltage of the generator, a regulation will occur which works in opposition to this diminution of voltage. Should the disturbance be of only short duration there will be no noticeable change in the number of revolutions of the generator B, and as a consequence a normal condition will therefore very rapidly appear after the disturbance has ceased. The operation takes place in similar manner when there is a disturbance which works in the direction of an increase of the voltage $E_a$.

If disturbances of longer duration occur, the fly wheel E no longer has the power to keep the number of revolutions of the auxiliary generator B practically constant. The proceeding in such a case will be explained by means of the diagram given in Fig. 2. In this case the line $o\ a$ denotes the voltage characteristic of the main generator A, relative to the common number of revolutions $n$ of the motor C, and the auxiliary generator B; and the line $o\ b$ the voltage characteristic of the generator B also relative to the number of revolutions $n$. The characteristic $o\ b$ is a straight line when the auxiliary generator B is constantly excited; the characteristic $o\ a$ is a curve bent convexly against the abscissa axis when the motor C is a shunt motor. The abscissa $o\ c$ of the intersecting point $d$ of the two characteristics, represents the number of revolutions $n$ existing during normal conditions in which the voltage of the generator A, represented by the ordinate $c\ d$, has the same value as the voltage of the auxiliary generator B.

It will now be supposed that a disturbance occurs which would cause a diminution of the voltage $E_a$ to the value $c\ e$ if the exciting winding $a^1$ was disconnected. The number of revolutions $n$ will then diminish to the value which is represented by the abscissa $o\ f$ of that point $g$ of the characteristic $o\ a$, the ordinate of which is equal to $c\ e$. The voltage $E_b$ will then have the value $f\ h$. This value is greater than the value $f\ g$ to which the voltage $E_a$ has dropped in consequence of the condition that the characteristic $o\ a$ is convexly curved relative to the abscissa axis. If we now suppose that the exciting winding $a^1$ is connected in order to agree with the actual conditions, there will therefore appear in said winding a compensating current which will cause an increase of the value of $E_a$. By longer duration of the disturbance a condition of equilibrium will now occur, in which case the following conditions will obtain, namely the number of revolutions $n=o\ i$ and the voltage $E_a=i\ k$ and $E_b=i\ m$. In order to create a condition of equilibrium, the difference in voltage $E_b - E_a = m\ k$ has to be just so large that it generates in the winding $a^1$, a current, which is able to create voltage increase $k\ n=i\ k-f\ g$, which the generator A had received. It might now be supposed in the first approximation that the voltage increase $k\ n$ is proportional with the exciting current and therefore also with the voltage difference $m\ k$. The values $m\ k$ and $k\ n$ will then be in constant relation, which is determined by the magnetic characteristic of the exciting winding $a^1$. As will now be evident, the point $k$ may therefore be determined as point of intersection of the characteristic $o\ a$ and a straight line, which connects the point $p$ with the point $q$, dividing the line $d\ e$ into the desired constant proportion, the point $p$, forming the intersection between the straight line $e\ n\ g$ and the straight line $o\ b$.

As may be seen directly from the diagram, the value $i\ k$ which the voltage $E_a$ will have during the condition of equilibrium will approach its normal value $c\ d$ so much closer, the nearer the point $q$ is situated to the point $d$; that means the smaller the ratio is between the voltage difference $E_b - E_a$, delivered by the exciting current, and the hereby generated voltage increase of the generator A. For this reason the exciting winding $a^1$ should not be arranged directly on the field frame of the generator A as has been represented in the drawing for sake of simplicity, but preferably on a special exciting machine see Fig. 3. It will moreover be evident from the diagram that it is advantageous to select the ratio in such a manner that the characteristic $o\ a$ runs as steep as possible near the point $d$.

The regulation operates in similar manner when it concerns a disturbance, which works in the direction of increasing the normal voltage of the generator A.

From the above description it will be of importance that the motor C is a shunt motor and simultaneously that the auxiliary generator B is constantly excited, if any significance is placed thereupon that the regulation also works during longer duration of disturbance of the normal condition in the direction of reëstablishing this condition. This, however, need not be the case if it is considered significant only to have quick reëstablishment of the normal voltage during disturbances which are of only short duration. In this case it is only of importance apart from the fly wheel E, that the auxiliary generator B possesses the quality to deliver a constant voltage with a constant number of revolutions.

I claim:

1. Arrangement for automatically regulating the voltage of a dynamo comprising a shunt winding and an auxiliary exciting winding for said dynamo, which winding is normally inoperative and only rendered operative when the voltage of said dynamo varies; a generator constituting an auxiliary source of voltage practically independent of the load of said generator, the armature of said generator being connected in opposition to the armature of said dynamo through said exciting winding, and an electric motor for driving said generator, said electric motor being fed by said dynamo and means for constantly exciting said auxiliary generator.

2. Arrangement for automatically regulating the voltage of a dynamo comprising a shunt winding and an auxiliary exciting winding for said dynamo, which winding is normally inoperative and only rendered operative when the voltage of said dynamo varies; a generator constituting an auxiliary source of voltage practically independent of the load of said generator, the armature of said generator being connected in opposition to the armature of said dynamo through said exciting winding, and an electric motor for driving said generator, said electric motor being fed by said dynamo and provided with a fly wheel.

3. Arrangement for automatically regulating the voltage of a dynamo comprising a shunt winding and an auxiliary exciting winding for said dynamo, which winding is normally inoperative and only rendered operative when the voltage of said dynamo varies; a generator constituting an auxiliary source of voltage practically independent of the load of said generator, the armature of said generator being connected in opposition to the armature of said dynamo through said exciting winding, and an electric motor for driving said generator, said electric motor being fed by said dynamo and provided with a fly wheel and means for constantly exciting said auxiliary generator.

4. Arrangement for automatically regulating the voltage of a dynamo comprising a shunt winding and an auxiliary exciting winding for said dynamo, which winding is normally inoperative and only rendered operative when the voltage of said dynamo varies; a generator constituting an auxiliary source of voltage practically independent of the load of said generator, the armature of said generator being connected in opposition to the armature of said dynamo through said exciting winding, and an electric motor for driving said generator, said electric motor having shunt excitation and being fed by said dynamo and provided with a fly wheel; and means for constantly exciting said auxiliary generator.

The foregoing specification signed at Barmen, Germany, this third day of December, 1913.

LUDWIG SCHÖN. [L. S.]

In presence of—
ALBERT NUFER,
JULIUS FESTNER.